United States Patent
Hu et al.

(10) Patent No.: US 7,243,597 B2
(45) Date of Patent: Jul. 17, 2007

(54) UNIT FOR THE PREPARATION OF A FOAMY BEVERAGE FROM A CAPSULE AND AN OPENING PLUNGER

(75) Inventors: Ruguo Hu, New Milford, CT (US); John R. Bernardi, New Milford, CT (US); Corey M. Arrick, New Milford, CT (US); Ennio Bardin, Orbe (CH)

(73) Assignee: Nestec S.A., Vevey (CH)

( * ) Notice: Subject to any disclaimer, the term of this patent is extended or adjusted under 35 U.S.C. 154(b) by 460 days.

(21) Appl. No.: 10/371,268

(22) Filed: Feb. 21, 2003

(65) Prior Publication Data
US 2004/0163543 A1    Aug. 26, 2004

(51) Int. Cl.
*A47J 31/32* (2006.01)
*A47J 31/24* (2006.01)
(52) U.S. Cl. ............................. 99/283; 99/295; 99/299
(58) Field of Classification Search ................. 99/295, 99/299, 280, 283
See application file for complete search history.

(56) References Cited

U.S. PATENT DOCUMENTS

| 5,242,702 A | 9/1993 | Fond |
| 5,398,596 A | 3/1995 | Fond |
| 5,472,719 A * | 12/1995 | Favre ........................... 426/77 |
| 5,980,965 A * | 11/1999 | Jefferson et al. ............ 426/433 |
| 2005/0084569 A1 * | 4/2005 | Hu et al. ..................... 426/118 |

FOREIGN PATENT DOCUMENTS

| EP | 1243210 | 9/2002 |
| WO | WO02076270 | 10/2002 |

* cited by examiner

*Primary Examiner*—Reginald L. Alexander
(74) *Attorney, Agent, or Firm*—Bell, Boyd & Lloyd LLP

(57) ABSTRACT

A unit having a collecting device with a seat arranged to receive a disposable capsule containing a soluble product, such as a beverage-forming powder. The capsule contains at least one inlet port for a diluting fluid introduced into the capsule, at least one outlet port for delivery of a beverage provided by thorough mixing of the soluble product and the diluting fluid, and a bottom wall. The unit also includes a throttling arrangement provided by an engaging surface of a plunger that is operatively associated with the outlet port of the capsule. The engaging surface of the plunger is positioned and arranged outside of the capsule before the diluting fluid enters into the capsule, with the throttling arrangement created as diluting fluid is urged to enter the capsule by expansion of the capsule bottom wall and by forcing the engaging surface of the plunger to snugly fit through the outlet port. This limits the introduction of the plunger inside the capsule to the limited displacement of the bottom wall as a result of its deformation under pressure.

13 Claims, 2 Drawing Sheets

UNIT FOR THE PREPARATION OF A FOAMY BEVERAGE FROM A CAPSULE AND AN OPENING PLUNGER

FIELD OF THE INVENTION

The present invention relates to the preparation of a liquid food from a capsule containing dry food substance. More particularly, the invention relates to a method for preparing a foamy liquid food such as a hot beverage with an enhanced head of foam that is obtained from mixing a diluent with soluble powder within a predosed capsule. The invention also relates to a device adapted for such a method.

BACKGROUND OF THE INVENTION

Foamed beverages such as espresso, cappuccino and latte prepared from dispensing machines are becoming more and more popular. Methods of preparation of such products from a predosed capsule are also known. The principle of using pre-metered and pre-packed portions of coffee or the like for the preparation of coffee or other beverages has the advantage of facilitating the preparation of the beverage while ensuring that the dose-to-dose quality and strength of the beverage remains constant for the same preparation conditions (dosage, temperature, pressure, time. etc . . . ). It also provides more convenience to the user. The capsule usually sits in a leak-tight enclosure of a special coffee type machine and hot water is passed through the capsule under pressure. The use of roast-and-ground powder is widely utilized commercially in capsules that perforate under the building-up of pressure to release the extracted liquid. Attempts have been made to develop systems of preparation of beverages from a disposable capsule containing soluble powder.

WO 02076270 describes a unit for preparing beverages from soluble products. This unit comprises a seat designed to receive a disposable cartridge comprising at least one inlet port for a suspension fluid to enter the cartridge, and at least one outlet port for the delivery of the beverage. The unit further comprises at least one throttling arrangement to give the beverage a laminar flow as it is released from the cartridge. In such a system, a piercing member deeply enters the capsule, thus reducing the volume available for diluting fluid and the soluble powder mixing within the capsule. The narrow outlet port created by the throttling arrangement also prevents the outflow of larger particles or clots of soluble product that have not yet dissolved. Therefore, a significant amount of powder tends to accumulate in contact with the piercing member and does not dissolve during the mixing phase with water. Furthermore, according to the description of the throttling arrangement, the portion of the piercing member entering the capsule has a shape and dimensions substantially equal to those of the capsule outlet port. This means that manufacturing of the capsule and of the piercing member have to be very precise, because any variation in dimensions lead to variations in terms of water flowing speed or pressure in the capsule, and these lead to variations in beverage quality.

The problem met with this existing system comes from the fact that a large portion of the piercing member enters the capsule and occupies too much of the volume of the capsule. This reduces the space available for mixing with water and shearing, causing some undissolved powder to remain dry and stuck to the portion of the piercing member that entered the capsule. Undissolved powder is of course not available for the mixing, and beverages will have less taste or will be less foamy than they otherwise would be if the powder was entirely and homogeneously mixed with water. This also causes variations in the quality of the beverages depending on the quantity of powder dissolved which participates to the mixing and foaming.

The present invention now overcomes these problems.

SUMMARY OF THE INVENTION

The present invention provides an improved unit for the preparation of a foamy beverage from a soluble product that reduces the risks of the powder compacting within the capsule before and during mixing and allowing a greater amount of powder to be dissolved.

For this, the invention relates to a unit comprising a collecting device with a seat arranged to receive a disposable capsule containing the soluble product. The capsule contains at least one inlet port for a diluting fluid introduced into the capsule, at least one outlet port for delivery of a beverage provided by thorough mixing of the soluble product and the diluting fluid, and a bottom wall. The unit also includes a throttling arrangement provided by an engaging surface of a plunger that is operatively associated with the outlet port of the capsule. Advantageously, the engaging surface of the plunger is positioned and arranged outside of the capsule before the diluting fluid enters into the capsule, with the throttling arrangement created as diluting fluid is urged to enter the capsule by expansion of the capsule bottom wall and by forcing the engaging surface of the plunger to snugly fit through the outlet port, thereby limiting the introduction of the plunger inside the capsule to the limited displacement of the bottom wall as a result of its deformation under pressure.

A very limited length of the plunger enters the capsule. Specifically, the plunger extends into the capsule through the outlet port by no more than 3 mm of the plunger length. Preferably, the plunger extends into the capsule by a maximum length of 2 mm from the capsule bottom wall. As a result of this, an efficient and complete dissolution of the powder into the diluting fluid occurs, providing an improvement of the quality of the beverage, with no waste inside the capsule and good foaming upon release of the pressure.

The plunger is advantageously connected to a control mechanism that withdraws the plunger after the pressure in capsule has been maintained a sufficient time to enable soluble product and diluting fluid to properly mix together to form the beverage. This generally occurs after a pressure of at least 2 bars during a period of at least 5 seconds has been maintained in the capsule. Preferably, the control mechanism retracts the plunger from the outlet port in order to enable the beverage formed by mixing of the soluble product and diluting fluid to fully drain from the capsule through the outlet port.

The engaging surface that enters the capsule may be positioned by contact with a supporting member having a surface of larger section than that of the outlet port, with the supporting member positioned on the capsule bottom wall. This surface of the supporting member preferably has a dome shape to allow high shear force fluid discharge without blocking fluid flow. If desired, the dome shape may include at least one channel of 0.01 to 1 square mm to assist in beverage flow. Alternatively, the dome shape can include a textured or roughened surface which forms random flow channels with the capsule bottom through which the beverage can flow. Also, the capsule bottom wall is generally made of a rigid or semi-rigid plastic material.

The engaging surface of the plunger also may have a section that is at least the same as or larger than that of the outlet port to form an interference fit between the outlet port and the plunger. The collecting device further comprises means for supporting the capsule fitted in the seat, with the supporting means arranged to maintain the engaging surface of the plunger outside the outlet port before the diluting fluid enters the capsule. In a most preferred embodiment, the engaging surface of the plunger and the outlet port each have essentially the same sectional profile, and the engaging surface of the plunger is substantially cylindrical.

The invention also relates to a method for the preparation of a frothy beverage with a creamy or stable head of foam from a soluble product contained in a disposable capsule where the capsule is fitted in the seat of a collecting device, Diluting fluid is conveyed into the capsule via an inlet port and is forced through a throttling arrangement, obtained by forcing a plunger through an outlet port of the capsule. This throttling arrangement is carried out under the pressure of diluting fluid entering the capsule whereby dissolution of the soluble product in the diluting fluid is improved as less interaction or compaction of soluble product, in the solid state, occurs with the plunger.

BRIEF DESCRIPTION OF THE DRAWING FIGURES

Other features and advantages of the invention will become apparent from the following description in conjunction with the accompanying drawings provided solely by way of example.

DETAILED DESCRIPTION OF THE PREFERRED EMBODIMENTS

Figure 1:
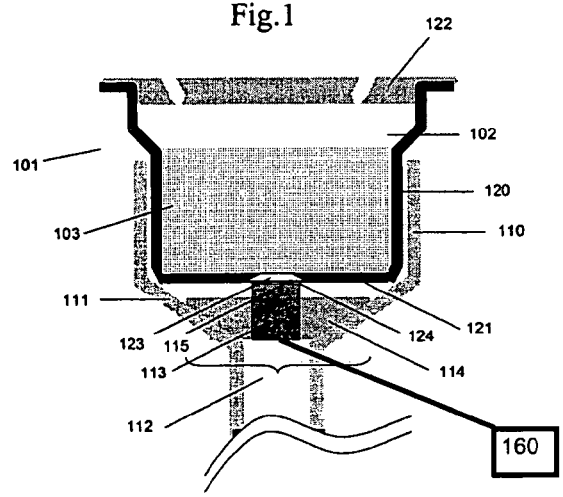
FIG. 1 is a cross-sectional view of the unit and capsule as positioned in the working position but before beverage preparation stage.

The invention relates to a unit for the preparation of a beverage from a soluble product obtained by supplying hot water within a capsule under pressure and releasing the beverage from the capsule. The unit preferably comprises a collecting device with a seat arranged to receive a disposable capsule comprising a food substance therein and a plunger with an engaging surface providing a throttling arrangement. The capsule comprises a first surface adapted to be traversed by a flow of diluting fluid entering the capsule and a second surface adapted to be traversed by a flow of beverage exiting the capsule. The second surface is adapted to deform outwardly upon action of the inside water pressure thereon, and includes an opening area. The unit is characterized in that the engaging surface of the plunger does not enter the capsule before the pressure has built up into the capsule enough to deform downwards the second surface of the capsule. Also, there is a tight relation between the section of the engaging surface and the section of the opening area of the second surface of the capsule, thus providing a throttling arrangement. Furthermore, a very limited length of that engaging surface enters the capsule to allow mixing of the powder and liquid. This results in an efficient and complete dissolution of the powder into the diluting fluid. A significant improvement in the quality of the beverage is provided, as there is no waste of powder inside the capsule and good foaming of the beverage upon release of the pressure.

Preferably, the engaging surface is maintained close outside or touching with the opening area before pressure building-up. When the pressure has built up enough to deform the second surface of the capsule, it makes the engaging surface of the plunger flush the capsule, or slightly enter into the capsule, the length of plunger entering into the capsule being not more than 3 mm from the internal bottom surface of the capsule. The engaging surface of the plunger should not be recessed from the bottom surface of the capsule, yet not to loose too much shear surface, but should come at least flush to the bottom surface. Therefore, the free end of the plunger should come from a substantially flush position with the internal bottom surface of the capsule to a distance that should be no more than 3 mm, preferably no more than 2 mm from the internal bottom surface. Therefore, the volume filled by the engaging surface in the capsule is preferably as low as possible, thus allowing the maximum free space to be available for soluble powder mixing and dissolving in diluting fluid.

The engaging surface of the plunger has a required shape and dimensions to tightly fit to the opening area of the bottom and discharging surface of the capsule, both having essentially the same sectional profile. In a preferred embodiment, the engaging surface of the plunger is cylindrical, and the opening area of the second surface of the capsule forms a complementary circular annular portion.

In another embodiment, the plunger is formed of two distinctive parts, the first one being the engaging part of the plunger that enters the capsule and the second part being the supporting member having a surface of larger cross section than that of the outlet port. The supporting member of the plunger may advantageously have the shape of a dome to add shear surface interacting with the liquid. The dome shaped member also provides support for at least one external portion of the capsule in order to limit the penetration of the engaging part into the capsule, and also to avoid too much deformation of the second surface of the capsule as pressure builds up inside. It also allows high shear force fluid discharge, yet not block the flow of fluid.

The dome shaped part generally has a section larger than the cylindrical engaging surface part. Preferably, the cross section of the engaging surface of the plunger is substantially equal or slightly larger than the section of the opening area of the capsule to form a snug fit between the plunger and the capsule opening area.

The throttling arrangement is created as diluting fluid is urged to enter the capsule by expansion of the capsule bottom wall and by forcing the engaging surface of the plunger to snugly fit through the outlet port, and by the tight interaction between the dome shaped supporting member and the bottom of the capsule which allows high shear force fluid discharge. As the diluting fluid enters the capsule and as the throttling arrangement provided by the plunger snuggly fits the outlet port of the capsule, the narrowing of the passageway of the beverage delays its extraction, so that the operating pressure builds up inside the capsule. The pressure increases to at least 2 bars, more preferably up to at least 5 bars or more, for at least 5 seconds, before the opening area is pierced and the beverage begins to flow at the outlet port of the capsule.

The capsule outlet port may include precut breaking lines to facilitate opening and avoid tear off of other parts or bits of capsule when it is forced to open by the plunger. As water enters the capsule, the increasing pressure expands the bottom wall of the capsule downwards, pressing the outlet port against the engaging member which finally pierces the outlet port of the capsule according to the area delimited by the precut lines.

Restrictions can be provided in the engaging surface of the plunger and/or in the supporting member, and/or on the portion of the outlet port of the capsule in contact with the engaging surface, for controlling the release of beverage through the engaging surface, creating additional shearing and promoting foam generation. These restrictions may be channels, corrugations, and the like. The channel in the dome can be of the same cross-section area, or can be of an increased cross-section area, as desired.

The surface of the supporting member contains at least one channel of 0.01 to 1 square mm. The supporting member allows fluid discharging with high shear force, yet not block the flow of the fluid. The supporting member can have a textured surface such as a roughened surface which can form random tiny fluid flow channels with the capsule bottom for beverage to pass.

The plunger may be connected to a control mechanism 160 (FIG. 1) that withdraws the plunger from the outlet port after the pressure in the capsule has been maintained a sufficient time, at least 5 seconds, at a sufficient level, at least 2 bars, to enable soluble product and diluting fluid to properly mix together to form the beverage. As noted, the pressure is maintained at least 2 bars for 5 seconds before the control mechanism 160 withdraws the plunger. When the control mechanism 160 withdraws the plunger from the outlet port, the beverage formed by mixing the soluble product and diluting fluid can fully drain from the capsule through the outlet port.

In another aspect, the invention relates to a method to make a foamy beverage from a soluble product using the aforementioned unit.

Figure 2:
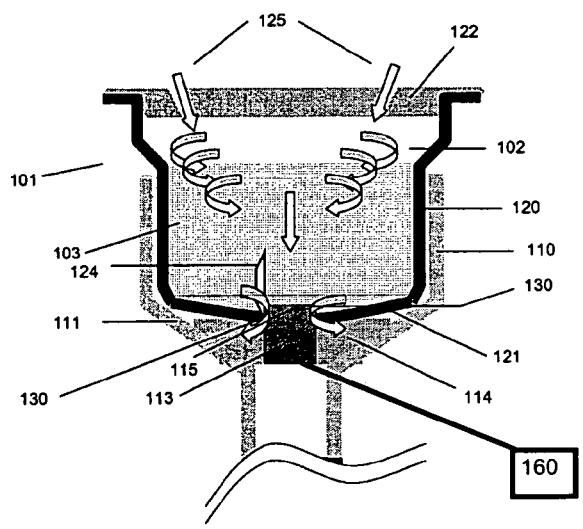
FIG. 2 is a cross-sectional view of the unit and capsule as positioned in the working position when the pressure increase causes the capsule bottom to expand and beverage starts discharging from the capsule.
Figure 3:
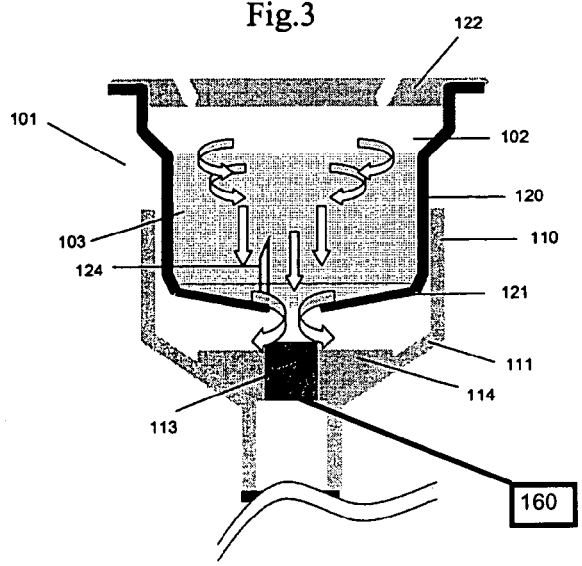
FIG. 3 is a cross-sectional view of the unit when piston is withdrawn from the capsule and when beverage is then free flowing.

Referring now to FIGS. 1 to 3, the invention illustrates a device 101 for preparing a liquid food such as beverage and the like from a disposable capsule 102.

In this embodiment, the capsule 102 is a closed capsule that contains a dry food 103, preferably a substance that is soluble by addition of a diluting fluid such as hot water, milk and the like, to form a foamy, frothy beverage. Suitable foamy, frothy beverages are, for instance, coffee with crema, cappuccino with a milk based foamy head, latte or cocoa. In the embodiment, the capsule has a frustoconical shape with an inverted cup part 120 and a lid part 121. The lid part provides the discharge of the capsule whereas the top 122 of the inverted cup part provides the entry side of the capsule. The cup part 120 has preferably a peripheral lip extending outwardly onto which is attached the edge of the lid part 121. The connection at the lip may be carried out by sealing or crimping or both. The shape of the capsule for the general purpose of the invention could also take frustoellipsoidal, frustospherical or cylindrical shapes, as well as other suitable shapes.

The device comprises a cup-shaped holder 110 adapted to receive the capsule 102 in a suitable seat 111. The seat 111 has a bottom side comprising a beverage and foam conditioner 112 adapted to open the capsule 102 for release of the beverage and to hold pressure within the capsule. More particularly, the beverage and foam conditioner comprises an engaging member 113 protruding from a bottom surface 114 of the seat. The engaging member 113 forms an engaging surface 115 that is intended to tightly and snuggly engage an opening area 123 defined by precut breaking lines made through the thickness of the bottom wall 121. Preferably, the engaging member 113 has a cylindrical shape complementary to the opening cross section. It has required dimensions to snuggly fit to the discharge side area 123 when the water enters the capsule and causes the increase of the pressure. The engaging member 113 may provide a contact against 20 to 99% of the total surface of the discharge side 121, preferably 40 to 80% of the total surface.

FIG. 1 shows the capsule 102 placed into the extraction device 101, in the working position, before diluting fluid enters the capsule. The engaging member 113 is then elevated to its working position. The plunger 113 is not entering the capsule yet, its engaging surface is maintained close outside or touching with the opening area. The bottom of the capsule, the said discharge side 121, is still in a substantially flat shape, and closed. The plunger 113 and discharging side of the capsule are in such a tight relation that it provides the throttling arrangement FIG. 2 shows the same at the second step of the process, when diluting fluid has begun to enter the capsule. The bottom wall discharging side 121 is then deformed downwards by the effect of the pressure increasing into the capsule. The building up of pressure is due to the water filling of the capsule, but also to the throttling arrangement which narrows passageways for beverage outlet. Further increasing of the pressure causes the discharging side 121 to press against the engaging member 113. The pressure keeps building up to at least 2 bars for at least 5 seconds. At this step, pressure can increase up to 5 bars or more. Finally, due to the pressure that presses the discharging side 121 of the capsule against the engaging member, the engaging member 113 pierces the capsule according the precut opening area 124. The beverage is still delayed by the throttling arrangement, but it begins to flow through the narrow passageways shown by arrows 130, between the engaging surface of the plunger 113 and the borders of the opening area.

FIG. 3 shows the same at the third step of the process. A controllable actuating means withdraws the plunger 113 from the capsule to a stand-by position, after the pressure in the capsule 102 has been maintained high enough, e.g., at at least 2 bars, and for a sufficient time, e.g., at least 5 seconds, to enable all soluble powder to be dissolved and properly mixed. The beverage is then free flowing through the opening area widely opened. At this step water may be keep on to enter the capsule to obtain a more diluted beverage or water can be ceased to obtain a more concentrated beverage.

Figure 4:
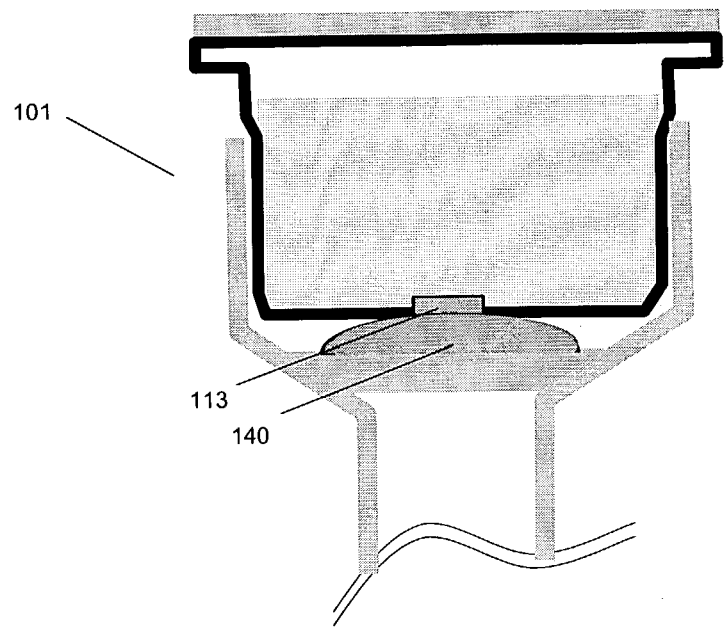
FIG. 4 is a cross-sectional schematic view of the unit and capsule with the dome shaped plunger embodiment.

FIG. 4 shows an embodiment wherein the lower part 140 of the engaging member 113 is in the shape of a dome 140. That dome 140 supports the bottom wall 121 of the capsule 102, and allows fluid discharging with higher shear force, yet not block the flow of the fluid thus participating to the throttling arrangement.

Figure 5:
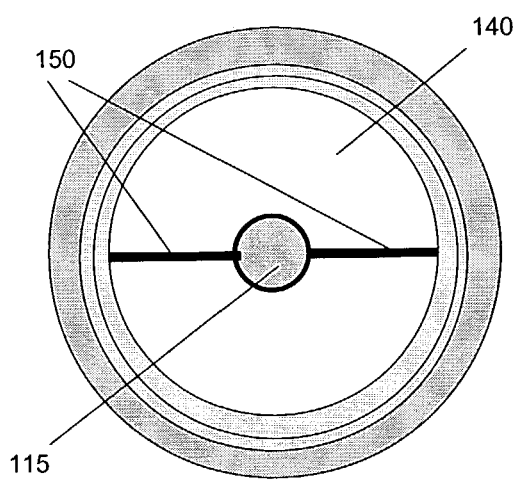
FIG. 5 is top view of the dome shaped plunger with 2 integrated channels.
Figure 6:
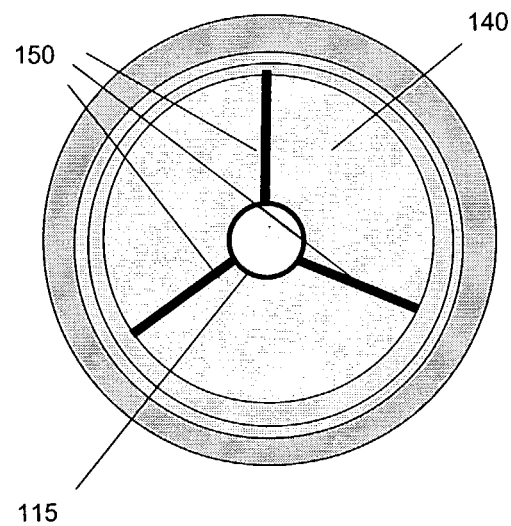
FIG. 6 is top view of the dome shaped plunger with 3 integrated channels.

FIG. 5 shows the surface of the dome 140 which is in contact with the external part of the bottom of the capsule during beverage preparation, with two integrated channels 150. The dome either contains at least one channel of 0.01 to 1 square mm. Dome also can have a textured surface such as rough surface which can form random tiny fluid flow channels with the capsule bottom for beverage to pass FIG. 6 shows the surface of the dome 140 which is in contact with the external part of the bottom of the capsule during beverage preparation, with three integrated channels 150.

EXAMPLE

Beverages made with the unit of the invention, with a dome shaped support which had 3 integrated channels, were compared with beverages made with an existing system similar to the one described in WO 02076270. The trials were made several times for each of two kinds of beverages: cappuccino and espresso. Cups of 120 ml were made for cappuccino and cups of 60 ml were made for espresso. The volume of foam was measured and divided by the total volume of the beverage to obtain the ratio of foam in the beverage cup.

The summary of the results of the trials are reported in Table 1

TABLE 1

| Type of beverage | Existing system | Invention | Foam increasing % Invention vs existing system |
| --- | --- | --- | --- |
| Cappuccino volume 120 ml | 13-14% foam | 19-20% foam | +30 to +50% |
| Espresso volume 60 ml | 14-15% foam | 24-26% foam | +70 to +80% |

What is claimed is:

1. A unit for preparation of a foamy beverage from a soluble product, the unit comprising:
   a collecting device with a seat arranged to receive a disposable capsule containing the soluble product, with the capsule containing at least one inlet port for a diluting fluid introduced into the capsule, at least one outlet port for delivery of a beverage provided by thorough mixing of the soluble product and the diluting fluid, and a bottom wall; and
   a throttling arrangement provided by an engaging surface of a plunger that is operatively associated with the outlet port of the capsule;
   wherein the engaging surface of the plunger is positioned and arranged outside of the capsule before the diluting fluid enters into the capsule, with the throttling arrangement created as diluting fluid is urged to enter the capsule by expansion of the capsule bottom wall and by forcing the engaging surface of the plunger to snugly fit through the outlet port, thereby limiting the introduction of the plunger inside the capsule to the limited displacement of the bottom wall as a result of its deformation under pressure and wherein the plunger is connected to a control mechanism that withdraws the plunger after the pressure in the capsule has been maintained a sufficient time to enable the soluble product and the diluting fluid to properly mix together to form the beverage.

2. Unit according to claim 1 wherein the plunger extends into the capsule through the outlet port by ho more than 3 mm of the plunger length.

3. Unit according to claim 1, wherein the plunger extends into the capsule by a maximum length of 2 mm from the capsule bottom wall.

4. Unit according to claim 1, wherein the bottom wall is made of a rigid or semi-rigid plastic material.

5. Unit according to claim 1, wherein the control mechanism operates after a pressure of at least 2 bars during a period of at least 5 seconds has been maintained in the capsule.

6. Unit according to claim 1, wherein the engaging surface that enters the capsule is positioned by contact with a supporting member having a surface of larger section than that of the outlet port, with the supporting member positioned on the capsule bottom wall.

7. Unit according to claim 6, wherein the surface of the supporting member has a dome shape to allow high shear force fluid discharge without blocking fluid flow.

8. Unit according claim 7, wherein the dome shape includes at least one channel of 0.01 to 1 square mm.

9. Unit according claim 7, wherein the dome shape includes a textured or roughened surface which forms random flow channels with the capsule bottom through which the beverage can flow.

10. Unit according to claim 1, wherein the engaging surface of the plunger has a section that is at least the same as or larger than that of the outlet port to form an interference fit between the outlet port and the plunger.

11. Unit according to claim 1, wherein the collecting device further comprises means for supporting the capsule fitted in the seat, with the supporting means arranged to maintain the engaging surface of the plunger outside the outlet port before the diluting fluid enters the capsule.

12. Unit according to claim 1, wherein the engaging surface of the plunger and the outlet port each have essentially the same sectional profile.

13. Unit according to claim 1, wherein the engaging surface of the plunger is substantially cylindrical.

* * * * *